Patented Dec. 18, 1951

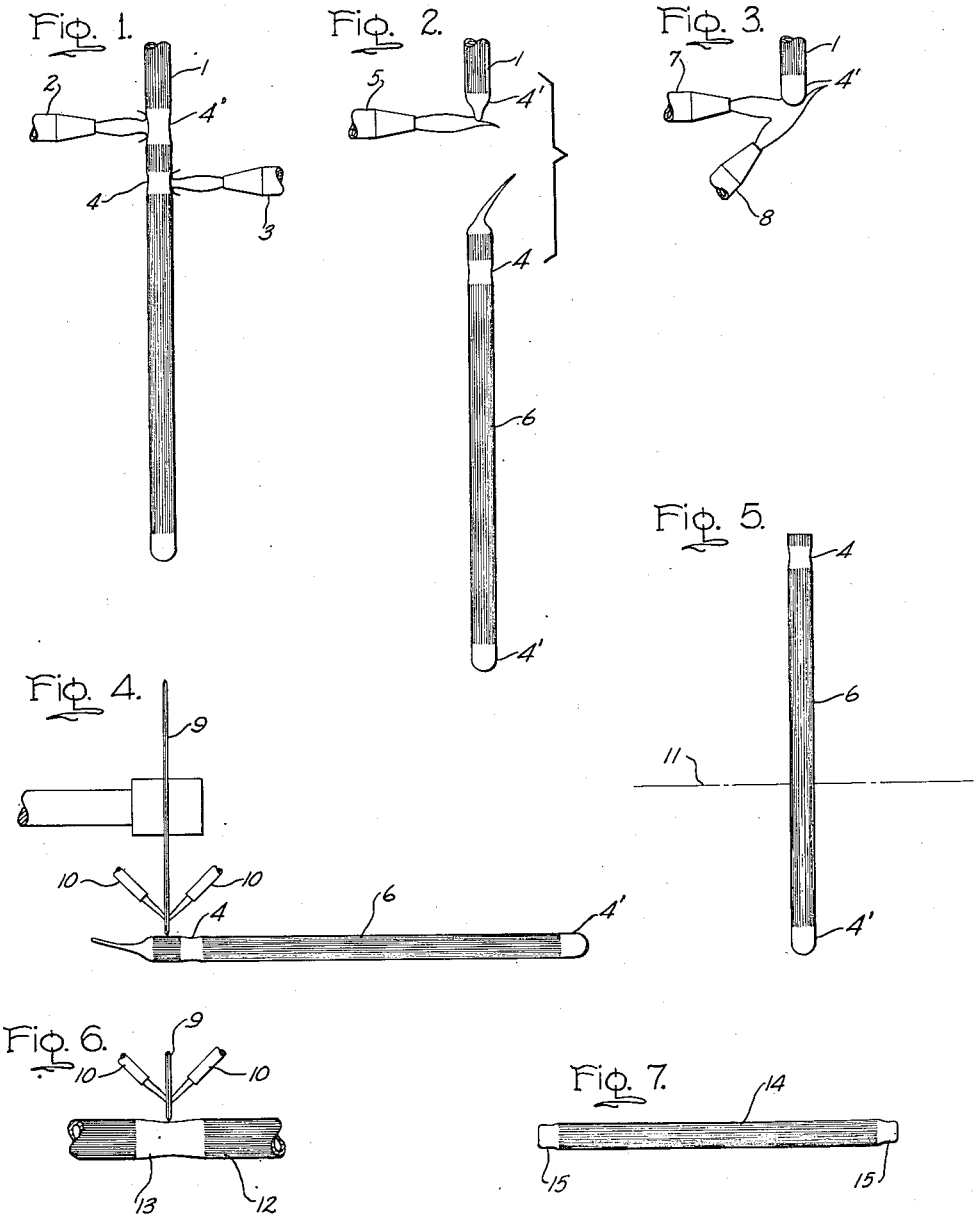

2,579,108

UNITED STATES PATENT OFFICE 2,579,108

QUARTZ WORKING PROCESS AND ARTICLE

Charles E. Bock, Cleveland, and Robert P. Burrows, Jr., South Euclid, Ohio, assignors to General Electric Company, a corporation of New York Application May 21, 1949, Serial No. 94,706

7 Claims. (Cl. 49—78.1)

Our invention relates generally to quartz working processes and to the resultant product, and more especially, but not exclusively, to operations involving severing or parting of tubing made from so-called translucent quartz.

As an example of one particular application of our invention reference will be made herein particularly to the manufacture of quartz tubes useful as "protection tubes" for immersion thermocouples used in measuring steel melt temperatures, the quartz tube serving as a housing around the thermocouple wires and protecting them from the steel melt upon immersion therein. In this application, a problem presents itself in that the closed end of the tube within the steel melt was apt to burst open. The problem persisted until it was discovered by the applicants that the source of the difficulty lay in the presence of water within the walls of the tube, the water being suddenly vaporized upon immersion of the tube into the steel melt and creating a pressure sufficient to burst the tube. The presence of the water was found to be due to the use of a wetted cutting wheel in severing the tubes, the wetting liquid being drawn into the walls of the tubes through minute longitudinally extending capillary ducts which are characteristically present in the walls of the translucent quartz tubing used for this purpose. Having discovered the cause of the difficulty, the applicants solved the problem in accordance with the present invention by glazing a section of the tube by application of heat thereto so as to consolidate the tube wall and close off the capillary ducts, thereby blocking the travel of the water or other liquid along the ducts by capillary action.

It will be understood that the invention is not limited to articles of the particular type referred to above but has general application to articles made from translucent quartz tubing and which are to be subjected to high temperatures after exposure to moisture. Thus, for example, the operation of glazing a section or sections of the tubing may be performed preliminarily to any severing operation involving the use of a wetted cutter and where the tubing is subsequently reheated, for instance to reshape it. Moreover, the glazing operation may be performed even when the tubing is not to be severed by a wetted cutter, but as a means of preventing the absorption of moisture in the tube walls from any source whatever. Thus, it has been found desirable to glaze sections of the immersion tubes referred to above even when they are not severed by a wetted cutter, in order to insure that no water or other liquid will be drawn into the walls thereof from any source whatever.

Further features and advantages of our invention will appear from the following detailed description of species thereof and from the drawing.

In the drawing, Fig. 1 is an elevation showing the first step in the heating of a section of a long length of tubing from which individual relatively short tubes are severed by gas flames, together with the step of glazing a section of the tube; Fig. 2 is a similar view showing the severing by a gas flame; Fig. 3 is a similar view showing the rounding off of the severed end of the remainder of the long length of tubing; Fig. 4 shows the operation of severing the individual tubes by a wetted cutting wheel; Fig. 5 is an elevation of a finished tube; Fig. 6 is an elevation showing a modified severing operation of a length of tubing; and Fig. 7 is an elevation of a tube which is open at both ends and also glazed at both ends.

Referring to the drawing, immersion tubes of the type referred to hereinbefore are preferably made from long lengths of translucent quartz tubing 1 from which the individual tubes are severed by oxy-hydrogen gas flames. The tubing 1 is of translucent quartz characterized by the presence of numerous and very small capillary ducts, or "capillaries," extending longitudinally within the walls of the tubing. In the step shown in Fig. 1, the vertically disposed length of tubing 1 is rotated about its axis and heated at a predetermined point by the oxy-hydrogen burner 2 preparatory to severing it at that point. Preferably as a part of the same step the tubing 1 is glazed by a second oxy-hydrogen burner 3 to form a clear section 4 wherein the material of the tube is consolidated to block off the capillary ducts, the tube being slightly necked in by this operation.

In the second step, shown in Fig. 2, the rotating tubing 1 is severed by an oxy-hydrogen burner 5 at the point previously heated by burner 2, to form an individual tube 6.

In the next step shown in Fig. 3, the end of the tubing 1 is definitely closed and rounded off by a pair of burners 7 and 8, the burner 7 being directed horizontally at the said tube end while the burner 8 is directed upwardly at an angle of approximately 45°. The tubing 1 is then moved downwardly to repeat the process beginning with the step shown in Fig. 1 wherein the lower end of the tubing 1 is shown rounded off from the operation shown in Fig. 3. Of course, the first time the step shown in Fig. 1 is performed on a given length of tubing 1 the lower end of the tubing is open and the portion severed therefrom by burners 2 and 5 is discarded.

After the individual tubes have cooled down, the end adjacent the glazed section 4 is severed as illustrated in Fig. 4 by a revolving diamond wheel cutter 9 having a thin rim comprising diamond particles held in a suitable bonding medium. The periphery or rim of the wheel is wetted by a suitable cooling liquid, preferably water, issuing from nozzles 10, 10 at opposite sides thereof. Dry cutting of the tube is impractical because of the time involved and also, at least in larger sizes of tubing, because of the care required to prevent chipping and cracking of the tubes. However, in the case of wet cutting, absence of the glaze ring 4 on the tube would cause water to be drawn into the capillary ducts in the wall of the tube toward the closed (lower) end of the finished tube shown in Fig. 5. It requires a period of several hours for the water to be drawn into the said end of the tube. It will be apparent, as indicated by the clear sections 4', that the closed end wall of the tube 6 also becomes glazed during its formation in the steps illustrated in Figs. 1–3.

In use, the tube 6 is immersed in the molten steel approximately to a level indicated by the dot-dash line 11 and the presence of moisture in the tube walls at a point below the said line 11 results in failure of the tube. In this particular application, the presence of moisture in the tube walls above the line 11 is not particularly critical and, therefore, the glazed ring 4 may be applied to the tube at any point above the said line 11.

Although we have illustrated the glazing step as being performed in conjunction with the preliminary flame severing step in Fig. 1, the said glazing step may be performed at any time prior to the wet cutting step illustrated in Fig. 4. Moreover, the glazing of translucent quartz tubing is advantageous even in the absence of wet cutting as illustrated in Fig. 4, in order that the tubing be protected from exposure to any source of moisture whatever in those cases where it is to be subjected to high temperatures after such exposure. To that end, the process illustrated in Figs. 1–3, the last piece remaining from a length of tubing 1 following the Fig. 3 step may be slightly longer than the desired finished length shown in Fig. 5. In that event, the flame cutting step shown in Figs. 1 and 2 may be dispensed with and the excess length severed by scratching with a file and snapping it off. Even then we nevertheless prefer to glaze a section of the tube as a precaution to entrance of moisture into the capillaries.

In Fig. 6 we have illustrated the wet wheel severing of a length of tubing 12 which has been glazed at the section 13 to prevent entrance of water from the wheel 9 into the capillaries of either section which is to be reshaped or otherwise subjected to high temperatures. In this case the tube 12 is severed at the center of the glazed section 13.

In Fig. 7 we have illustrated a length of translucent quartz tubing 14 which has been glazed over a section 15 at each end thereof to prevent the entrance of moisture into the capillaries in the tube wall.

What we claim as new and desire to secure by Letters Patent of the United States is:

1. The process of forming tubes having one end thereof closed from lengths of tubing of translucent quartz having longitudinally extending capillary ducts within the walls thereof which comprises applying heat successively to spaced portions of the tubing to sever it thereat and close at least one end to thereby form individual tubes closed at least at one end, glazing only a comparatively narrow section of a tube at a point remote from one closed end thereof by application of heat thereto to close off the said ducts by consolidating the tube wall, and then severing the tube with a wetted cutter at a point to leave at least a portion of the glazed section in the part of the tube including the said one end, the said glazed section serving to block travel of the wetting liquid along said ducts to the said one end of the tube.

2. The process of forming tubes having one end thereof closed from lengths of tubing of translucent quartz having longitudinally extending capillary ducts within the walls thereof which comprises applying heat successively to spaced portions of the tubing to sever it thereat and close at least one end to thereby form individual tubes closed at least at one end, glazing only a comparatively narrow section of a tube at a point adjacent one end thereof opposite the closed end by application of heat thereto to close off the said ducts by consolidating the tube wall, and then severing the tube with a wetted cutter at a point intermediate the glazed section and the said one end opposite the closed end, the said glazed section serving to block travel of the wetting liquid to the said closed end of the tube.

3. The method of cutting to length a translucent quartz tube having longitudinally extending capillary ducts within the walls thereof which comprises preliminarily glazing only a comparatively narrow section of the tube remote from one end thereof by application of heat thereto to close off said ducts by consolidating the tube wall and then severing the tube with a wetted cutter at a point to leave at least a portion of the glazed section in the part of the tube including the said one end, the said glazed section serving to block travel of the wetting liquid along said ducts to the said one end of the tube.

4. The method of cutting a length of translucent quartz tube having longitudinally extending capillary ducts within the walls thereof which comprises preliminarily glazing only a comparatively narrow section of the tube by application of heat thereto to close off said ducts by consolidating the tube wall and then severing the tube through said glazed section with a wetted cutter, the said glazed section serving to block travel of the wetting liquid along said ducts.

5. A tube of translucent quartz having longitudinally extending capillary ducts within the walls thereof and having one end thereof closed by a glazed end wall constituting a part of the tube, said tube having only a relatively narrow section thereof remote from the closed end thereof also glazed so that the tube wall is consolidated thereat to close off the said ducts and thereby prevent entrance of moisture into said ducts between the said glazed section and the closed end.

6. A tube of translucent quartz having longitudinally extending capillary ducts within the walls thereof and having one end thereof closed by a glazed end wall constituting a part of the tube, said tube having only a relatively narrow section thereof adjacent the open end thereof also glazed so that the tube wall is consolidated thereat to close off the said ducts and thereby prevent entrance of moisture into said ducts between the said glazed section and the closed end.

7. A tube of translucent quartz having longitudinally extending capillary ducts within the walls thereof and having a comparatively narrow transparent glazed section adjacent only each end thereof wherein the tube wall is consolidated to close off the said ducts so as to prevent entrance of moisture into said ducts.

CHARLES E. BOCK.
ROBERT P. BURROWS, JR.

REFERENCES CITED

The following references are of record in the file of this patent:

UNITED STATES PATENTS

| Number | Name | Date |
|---|---|---|
| 761,111 | Thomson | May 31, 1904 |
| 1,051,035 | Voelker | Jan. 21, 1913 |
| 1,914,205 | Hooper et al. | June 13, 1933 |
| 1,969,658 | McIlvaine | Aug. 7, 1934 |
| 2,436,819 | Neidorf | Mar. 2, 1948 |
| 2,459,209 | Zagwyn et al. | Jan. 18, 1949 |

FOREIGN PATENTS

| Number | Country | Date |
|---|---|---|
| 346,940 | Great Britain | Apr. 23, 1931 |